United States Patent
Price et al.

(10) Patent No.: US 6,377,444 B1
(45) Date of Patent: Apr. 23, 2002

(54) HINGED HOUSINGS FOR ELECTRONIC DEVICES

(75) Inventors: Scott D. Price, Lebanon; Mark T. McClung, New Brunswick, both of NJ (US); Ronald K. Hutt, Warminster, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/451,045

(22) Filed: Nov. 30, 1999

(51) Int. Cl.⁷ .............................. G06F 1/16; E05D 7/00
(52) U.S. Cl. .................... 361/683; 361/686; 16/221; 16/342; 16/368; 345/168; 345/901; 455/90; 455/573
(58) Field of Search .................... 361/679, 683, 361/686; 455/90, 572, 573; 345/168, 156, 901; 16/221, 368, 308, 341, 342

(56) References Cited

U.S. PATENT DOCUMENTS

| | | | |
|---|---|---|---|
| 4,825,395 A | * 4/1989 | Kinser, Jr. et al. | 361/683 |
| 5,128,829 A | * 7/1992 | Loew | 361/683 |
| 5,179,502 A | * 1/1993 | Matsuda | 361/683 |
| 5,281,957 A | 1/1994 | Schoolman | 345/8 |
| 5,363,089 A | 11/1994 | Goldenberg | 340/825.44 |
| 5,436,792 A | 7/1995 | Leman et al. | 361/686 |
| 5,508,709 A | * 4/1996 | Krenz et al. | 343/702 |
| 5,608,604 A | * 3/1997 | Francis | 361/681 |
| 5,666,273 A | * 9/1997 | Kurchbart | 361/683 |
| 5,691,932 A | 11/1997 | Reiner et al. | 368/10 |
| 5,731,829 A | 3/1998 | Saito et al. | 347/104 |
| 5,751,548 A | 5/1998 | Hall et al. | 361/686 |
| 5,915,440 A | * 6/1999 | Repo | 16/330 |
| 5,917,175 A | 6/1999 | Miller et al. | 235/472 |
| 5,987,704 A | * 11/1999 | Tang | 16/354 |
| 6,091,938 A | * 7/2000 | Go | 16/303 |
| 6,154,359 A | * 11/2000 | Kamikakai et al. | 361/681 |
| 6,262,885 B1 | * 7/2001 | Emma et al. | 361/683 |

FOREIGN PATENT DOCUMENTS

JP  4-10012  * 1/1992 ............. G06F/1/16

* cited by examiner

Primary Examiner—Leo P. Picard
Assistant Examiner—Lisa Lea-Edmonds
(74) Attorney, Agent, or Firm—Leon Nigohosian, Jr.

(57) ABSTRACT

A hinged housing for an electronic device having a first body portion defining a first plane and having a surface with a control panel and a second body portion defining a second plane and having a mounting surface. The first and second body portions are pivotally hinged to rotate between a first position, in which said first plane and said second plane are at an obtuse angle, and a second position, in which the first plane and the second plane are oblique, such that in the second position the control panel is rotated at an angle greater than 180 degrees from the mounting surface. A hinged housing for an electronic device having a first body portion defining a first plane and having a surface with a control panel and a second body portion defining a second plane and having a mounting surface. The first and second body portions are pivotally hinged to rotate between a first position, in which the first plane and the second plane are parallel, and a second position, in which the first plane and the second plane are oblique, such that in the second position the control panel is rotated at an angle greater than 180 degrees from the mounting surface.

12 Claims, 6 Drawing Sheets

HINGED HOUSINGS FOR ELECTRONIC DEVICES

FIELD OF THE INVENTION

This invention relates generally to hinged housings and more specifically to hinged housings for electronic devices by which movably connected housing elements may be rotated into user-selectable positions.

BACKGROUND OF THE INVENTION

Many commonly known electronic devices utilize two housing elements which are movably connected by a type of hinge mechanism. The resulting arrangement of housing elements not only provides for a more compact electronic device, but also protects fragile components, such as switches or displays, which may be hidden when the electronic device is folded together. One example of a hinged electronic device is a wireless telephone having a microphone section that may be folded together with the main telephone section. Such a hinged telephone is typically more compact than conventional wireless telephones and, therefore, may be more conveniently carried by a user. Additionally, the telephone controls may be covered, and thus protected, by the microphone section when the telephone is folded into a closed position for carrying. When the telephone is to be operated, the microphone section is rotated into an open position typically at an obtuse angle to the main telephone section so that the user may listen via an ear piece located on the main telephone section and speak into the microphone.

Other electronic devices that commonly utilize a hinge mechanism are laptop computers. Laptop computers, which are designed to be very compact, usually employ a "flip-up" display section. When the display section is rotated into a closed position, the display and keyboard are concealed and protected from accidental breakage. Unlike conventional hinged telephones, however, when the display section is released from the closed position, it may be rotated into many different positions. In this manner, the user may conveniently adjust the display section to a preferred position in which it is held by compression forces within the hinging mechanism.

However, although both of the hinge mechanisms described above for the wireless telephone and the laptop computer provide for compact storage and protection of fragile components during storage, these hinge mechanisms are not designed for hands-free operation by a user who is to wear the electronic device and have it stabilized so that the user may actively use controls on the device. Moreover, these hinged electronic devices cannot be moved from a hands-free configuration into a table-top configuration for desktop use.

Another type of electronic device that is hinged and can be worn by a user is disclosed in U.S. Pat. No. 5,363,089 issued to Goldenberg for a data communication receiver. The receiver has a display device which is hinged at the bottom of a body portion secured to a user's belt. Rotating the display away from the body portion permits the user to read a message on the display. Because the display portion is hinged at the bottom of the body portion attached to a user, however, the body portion is pulled away from the body of the user and not well-supported when the display portion is opened. Although this drawback is not as great for data receivers which do not require operating many controls by a user, in the case of data input/output devices which have controls on the device, the lack of stability created by this hinged configuration becomes more severe.

The foregoing illustrates limitations known to exist in present hinged electronic devices. Thus it is apparent that it would be advantageous to provide an alternative directed to overcoming one or more of the limitations set forth above. Accordingly an alternative hinged electronic device is provided including the features more fully disclosed hereinafter.

SUMMARY OF THE INVENTION

According to the present invention, provided in a first embodiment is a hinged housing for an electronic device having a first body portion defining a first plane and having a surface with a control panel and a second body portion defining a second plane and having a mounting surface. The first and second body portions are pivotally hinged to rotate between a first position, in which said first plane and said second plane are at an obtuse angle, and a second position, in which the first plane and the second plane are oblique, such that in the second position the control panel is rotated at an angle greater than 180 degrees from the mounting surface. Provided in another embodiment is a hinged housing for an electronic device in which the first and second body portions are pivotally hinged to rotate between a first position, in which the first plane and the second plane are parallel, and a second position, in which the first plane and the second plane are oblique, such that in the second position the control panel is rotated at an angle greater than 180 degrees from the mounting surface.

The foregoing and other aspects will become apparent from the following detailed description of the invention when considered in conjunction with accompanying drawing figures.

DETAILED DESCRIPTION OF THE PREFERRED EMBODIMENTS

Figure 1:
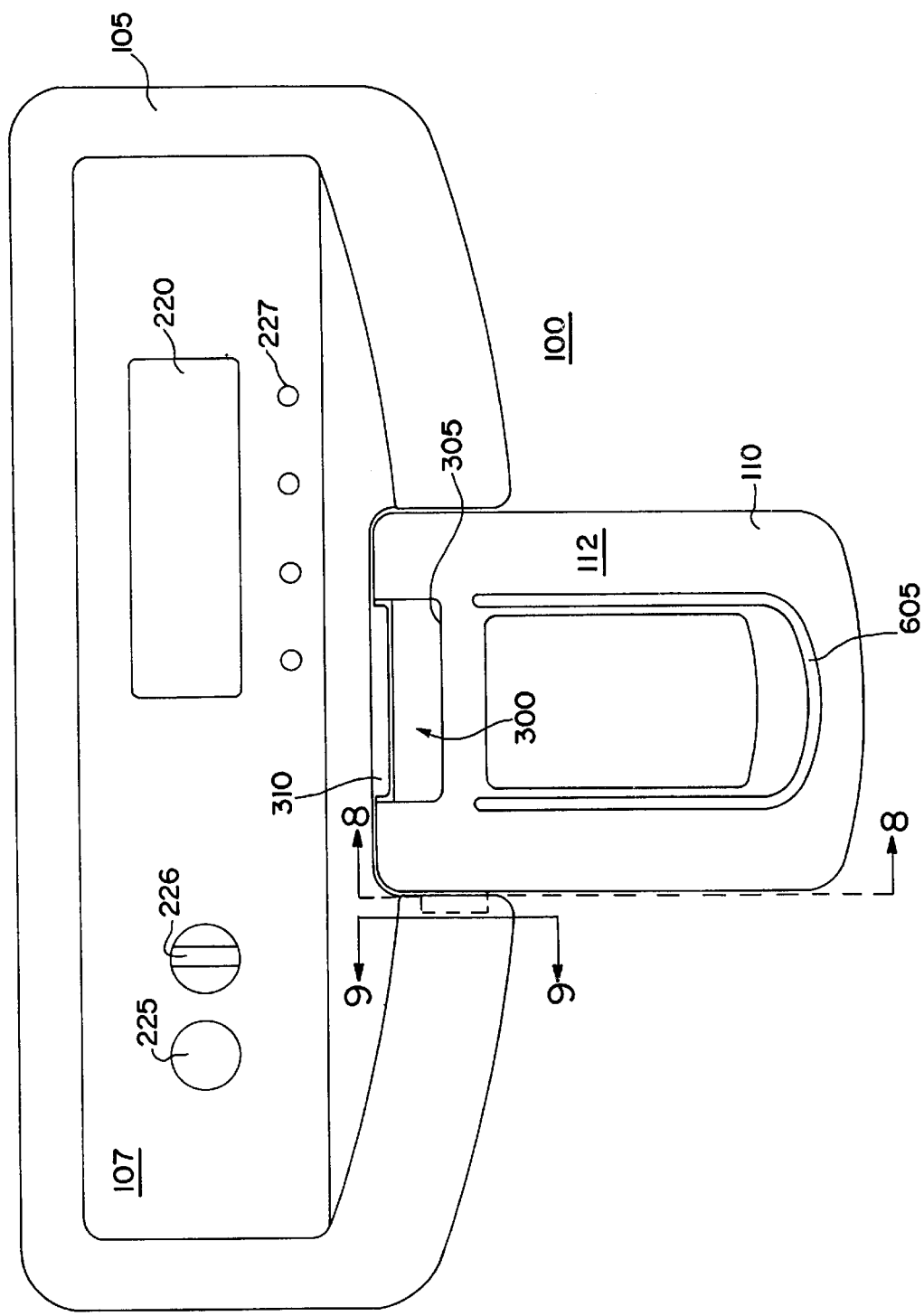
FIG. 1 is a plan view of a hinged housing utilizing a hinge mechanism in accordance with one embodiment of the present invention.

The invention is best understood by reference to the accompanying drawings in which like reference numbers refer to like parts. It is emphasized that, according to common practice, the various dimensions of the component parts as shown in the drawings are not to scale and have been enlarged for clarity.

Figure 2:
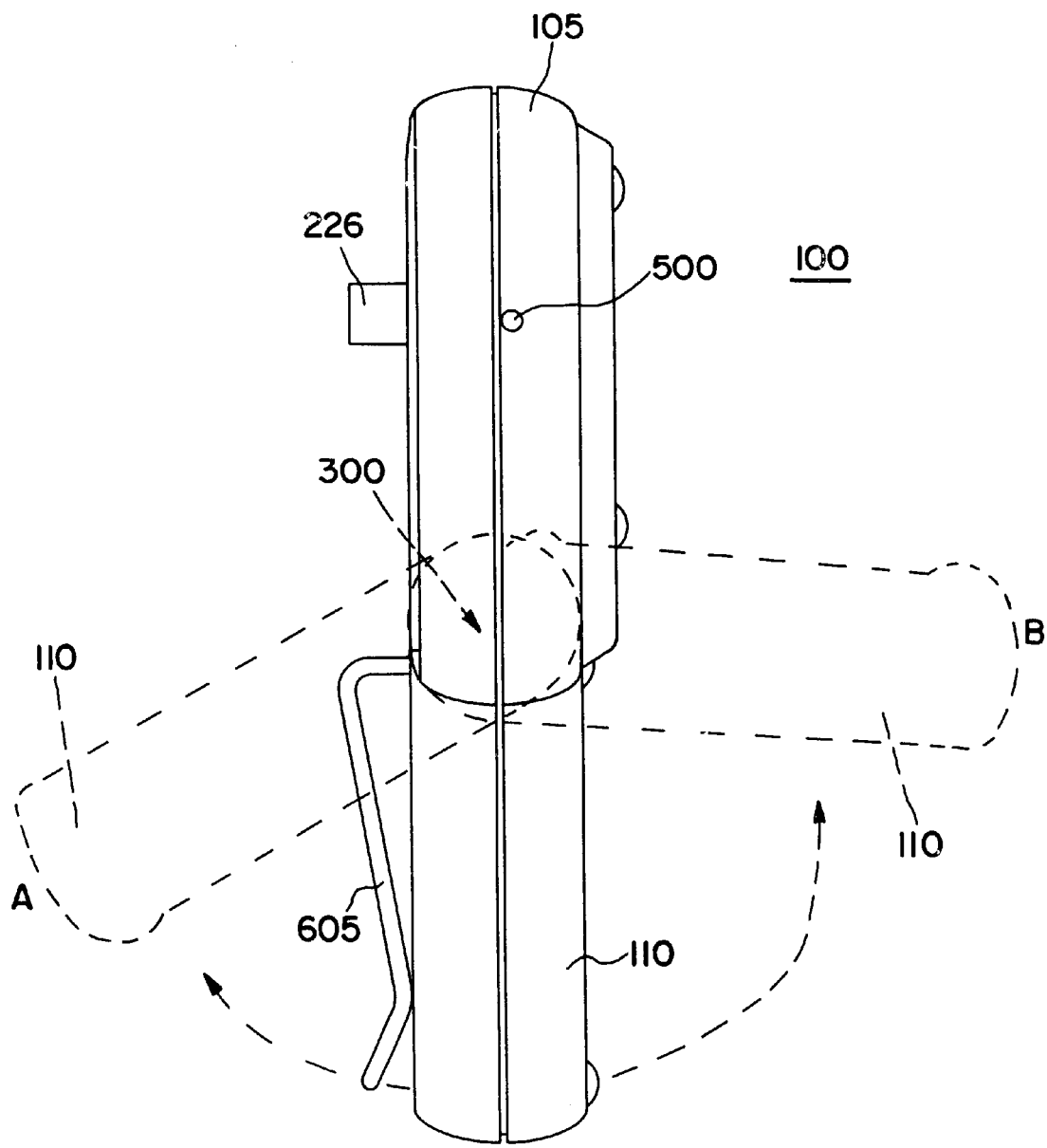
FIG. 2 is a side view of the hinged housing of FIG. 1 showing in phantom lines the range of motion between body portions of the hinged housing.
Figure 3:
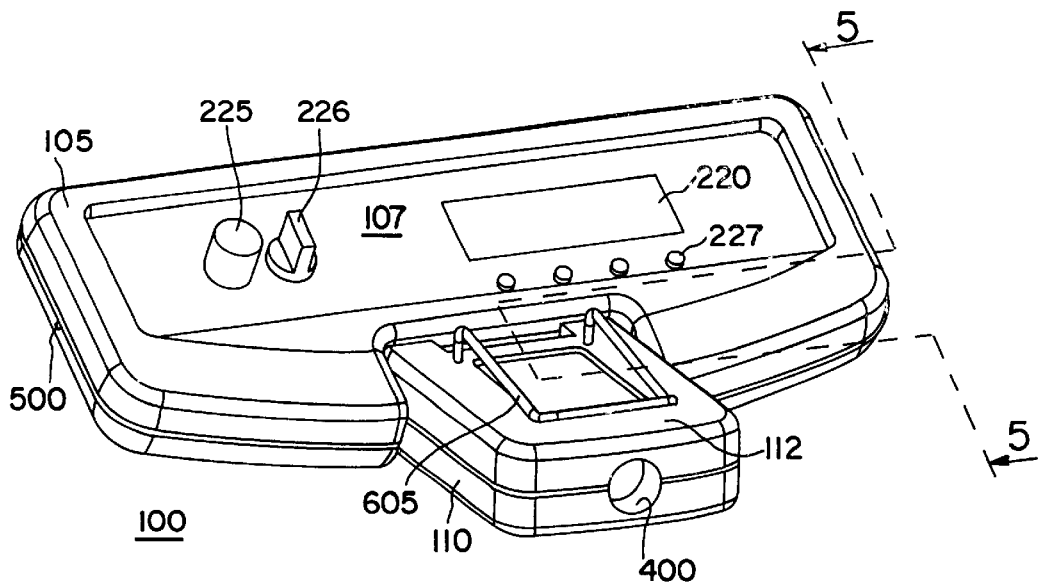
FIG. 3 is an isometric view illustrating a position in which the hinged housing of FIG. 1 may be set on a desk or table top in accordance with the preferred embodiment of the present invention.
Figure 4:
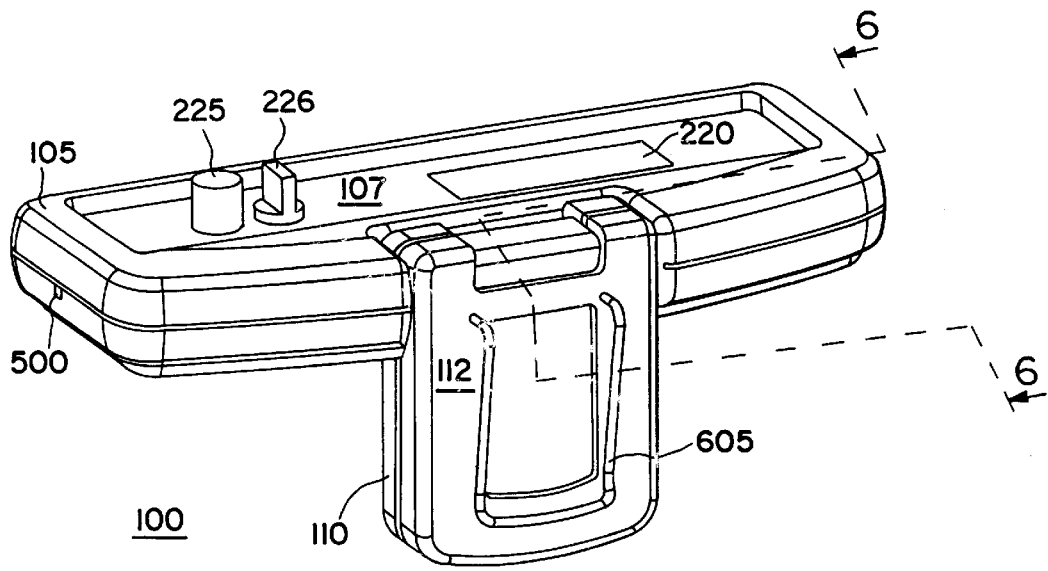
FIG. 4 is an isometric view illustrating a position in which the hinged housing of FIG. 1 may be worn by a user in accordance with the preferred embodiment of the present invention.
Figure 5:
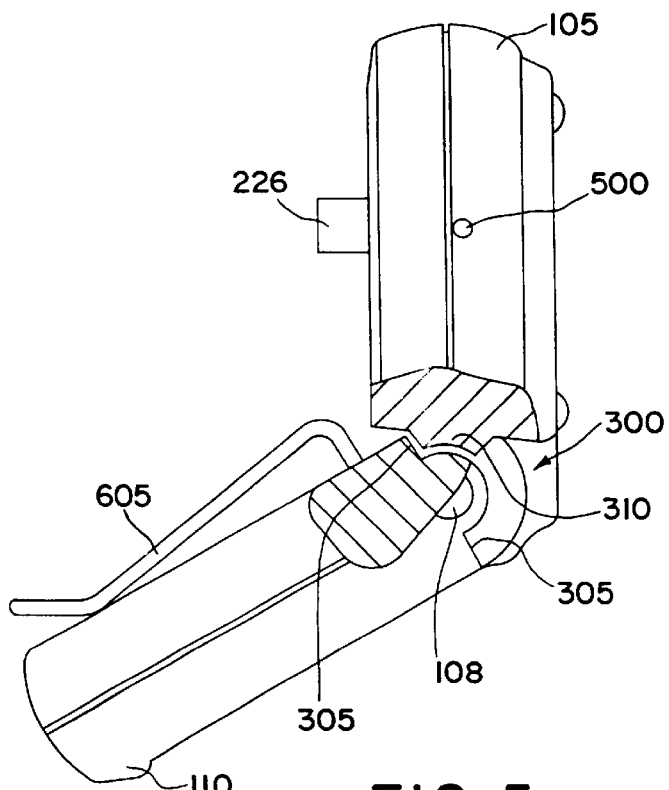
FIG. 5 is a sectional side view of the hinge mechanism of FIG. 3 along line 5—5 in accordance with the preferred embodiment of the present invention.
Figure 6:
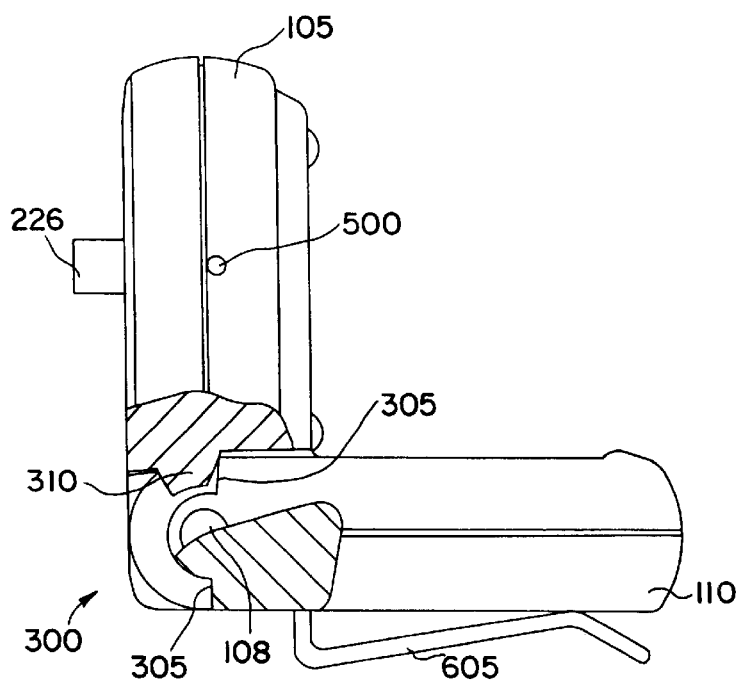
FIG. 6 is a sectional side view of the hinge mechanism of FIG. 4 along line 6—6 in accordance with the preferred embodiment of the present invention.

Referring now to the drawings, shown in FIG. 1 is a hinged housing 100 having a hinge mechanism 300. Hinged housing 100 includes a first body portion 105 defining a first plane and having a surface with a control panel and a second body portion 110 defining a second plane and having a mounting surface. In a first embodiment shown in FIG. 2, first body portion 105 and second body portion 110 are pivotally hinged to rotate between a first position, in which the first plane and the second plane are at an obtuse angle, and a second position, in which the first plane and the second plane are oblique, such that in the second position the control panel is rotated at an angle greater than 180 degrees from the mounting surface. As described in greater detail below, by this configuration, hinge mechanism 300 permits hinged housing 100 to be moved between the first position (also referred to hereinafter as a "desktop" configuration as shown in FIGS. 3, 5, and in phantom position "A" in FIG. 2) and the second position also referred to hereinafter as a "hip-mounted" configuration as shown in FIGS. 4, 6, and in phantom position "B" in FIG. 2). Hinge mechanism 300 may comprise a position control hinge which produces a high frictional torque within the hinge to keep the hinge at a set position. Other devices suitable for use in maintaining first and second body portions in their relative positions include spring-loaded detent hinges and locking support arrangements.

In an exemplary mode of operation, hinged housing 100 contains an internal computer device, such as a data input/output device or other such electronic device, within first body portion 105 which is connected to an electronic monitoring device (not shown) via a connector (not shown) inserted into data input/output port 400. Preferably, a battery pack is located within second body portion 110 and provides power to the electronic monitoring device to which it is electrically connected. A display unit 220, to be viewed by a user, is mounted on control panel 107 and electronically connected to the computer device in first body portion 105. Preferably, user-actuated controls 225, 226, 227, which permit a user to manipulate or otherwise control data on display unit 220, are also mounted on control panel 107 and electrically connected to the internal computer device.

Illustrated in FIG. 3 is an isometric view depicting an arrangement in which the hinged housing 100 may be set on a desk or a table top. In such an arrangement, the hinged housing 100 has been rotated so that first and second body portions 105, 110 are at an obtuse angle with display unit 220, controls 225 and mounting clip 605 being revealed as shown. The second body portion 110 is set flat on the desk or table top, and the first body portion 105 is rotated so that the display unit 220 is visible to the user. As described above, hinge mechanism 300 will hold first body portion 105 in the desired position, in this case the "desk" position. The hinged housing 100 having the hinge mechanism 300 in accordance with the preferred embodiment of the present invention may be positioned in any number of desired configurations by the user. FIG. 4 is an isometric view in which the hinged housing 100 may be carried by the user on an article of clothing, such as a belt. This configuration is achieved by rotating second body portion 110 from its position shown in FIG. 3 away from the first body portion 105 into a hip-mounted configuration, in which the first and second body portions 105, 110 are as shown in FIG. 4. In this formation, a mounting clip 605 mounted on a mounting surface 112 of second body portion 110 permits the hinged housing 100 to be secured to the user's belt or clothing. While the hinged housing 100 is in this position, the user may manipulate controls 225, 226, 227 to input or display data on the display unit 220, which is visible although the hinged housing 100 remains secured to the user's belt by the mounting clip 605. Optional attachment mounts 500 may additionally be provided for attachment to a shoulder strap.

Typical data input devices which are to be carried by a user have housings that, unlike the hinged housing 100 in accordance with the present invention, must often be removed from the belt and placed on a table so that the user can read or input data thereby inconveniencing the user. Moreover, unlike typical portable phone devices having body portions which only open to obtuse angles, according to the present invention the first body portion 105 is hinged to the top of second body portion 110 so that it can be hyper-extended beyond the axis of second body portion 110. This permits second body portion 110 to act as a stabilizing brace for first body portion 105 when attached to the hip of a user via mounting clip 605. By stabilizing the hinged housing 100 against the body of a user wearing the input/output device, the user may actively use controls on the device without excessive movement of the device.

Figure 8:
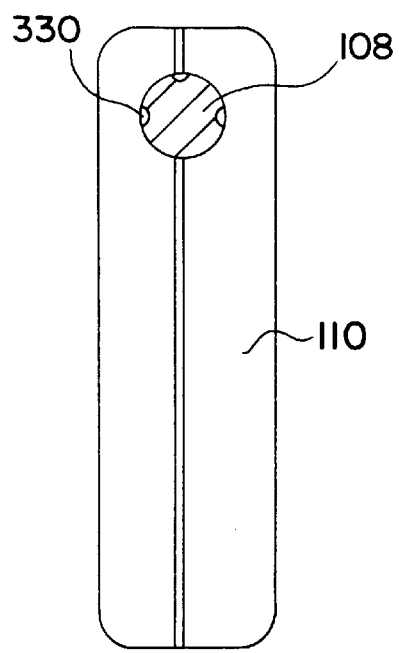
FIG. 8 is a sectional side view of the hinge mechanism of FIG. 1 along line 8—8 in accordance with the preferred embodiment of the present invention.
Figure 9:
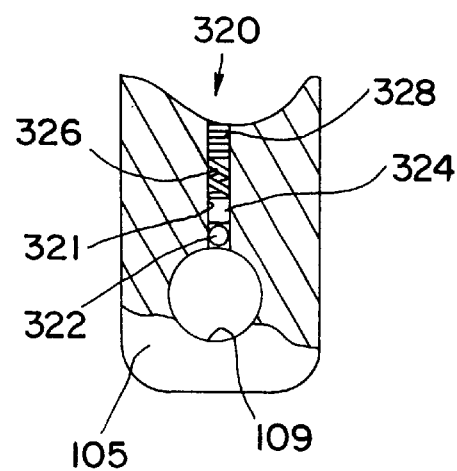
FIG. 9 is a sectional side view of the hinge mechanism of FIG. 1 along line 9—9 in accordance with the preferred embodiment of the present invention.

Referring to FIGS. 8 and 9, which are partial cutaway views taken along lines 8—8 and 9—9, respectively, of FIG. 1, hinge mechanism 300 is shown in more detail which preferably includes a hinge pin 108 located on second body portion 110 that pivotally rotates within a cylindrical bore 109 located on first body portion 105. Preferably, a locking mechanism 320 is provided to facilitate temporarily positioning first body portion 105 and second body portion 110 into various preset positions throughout the range of motion of hinge mechanism 300. Locking mechanism 320 preferably includes a ball 322 that is disposed within a hole 321 located in first body portion 105 which intersects cylindrical bore 109 as shown. Ball 322 is urged into a forward position in hole 321 toward cylindrical bore 109 by a spring 326 mounted between a spacer 324 (preferably of a urethane material) and a set screw 328 as shown. Located on hinge pin 108 is at least one ball slot or groove 330 for receiving ball 322. By this configuration, upon rotating first and second body portions relative to one another, ball 322 can move into and out of ball slots 330 to hold first and second body portions at desired relative positions.

Referring to FIGS. 5 and 6, which are cutaway views taken along lines 5—5 and 6—6, respectively, of FIGS. 3 and 4, preferably, hinge mechanism 300 is also provided with locking shoulders 305 which engage a detent 310 located as shown to limit the hinge mechanism to a desired range of motion.

Although hinge pin 108 and locking shoulders 305 of hinge mechanism 300 are shown on second body portion 110 and detent 310 and cylindrical bore 109 are shown on first body portion 105, it will be readily recognized to those skilled in the art that these features may be provided on the opposite body portions. In this manner, the first and second body portions 105, 110 may be pivotally rotated into a variety of different positions and held securely therein by the hinge mechanism 300, as described above. Therefore, in accordance with the preferred embodiment of the present invention, the hinged housing 100, unlike conventional hinged housings, may assume any of the multiple configurations shown illustrated in phantom, throughout the drawings.

Figure 7:
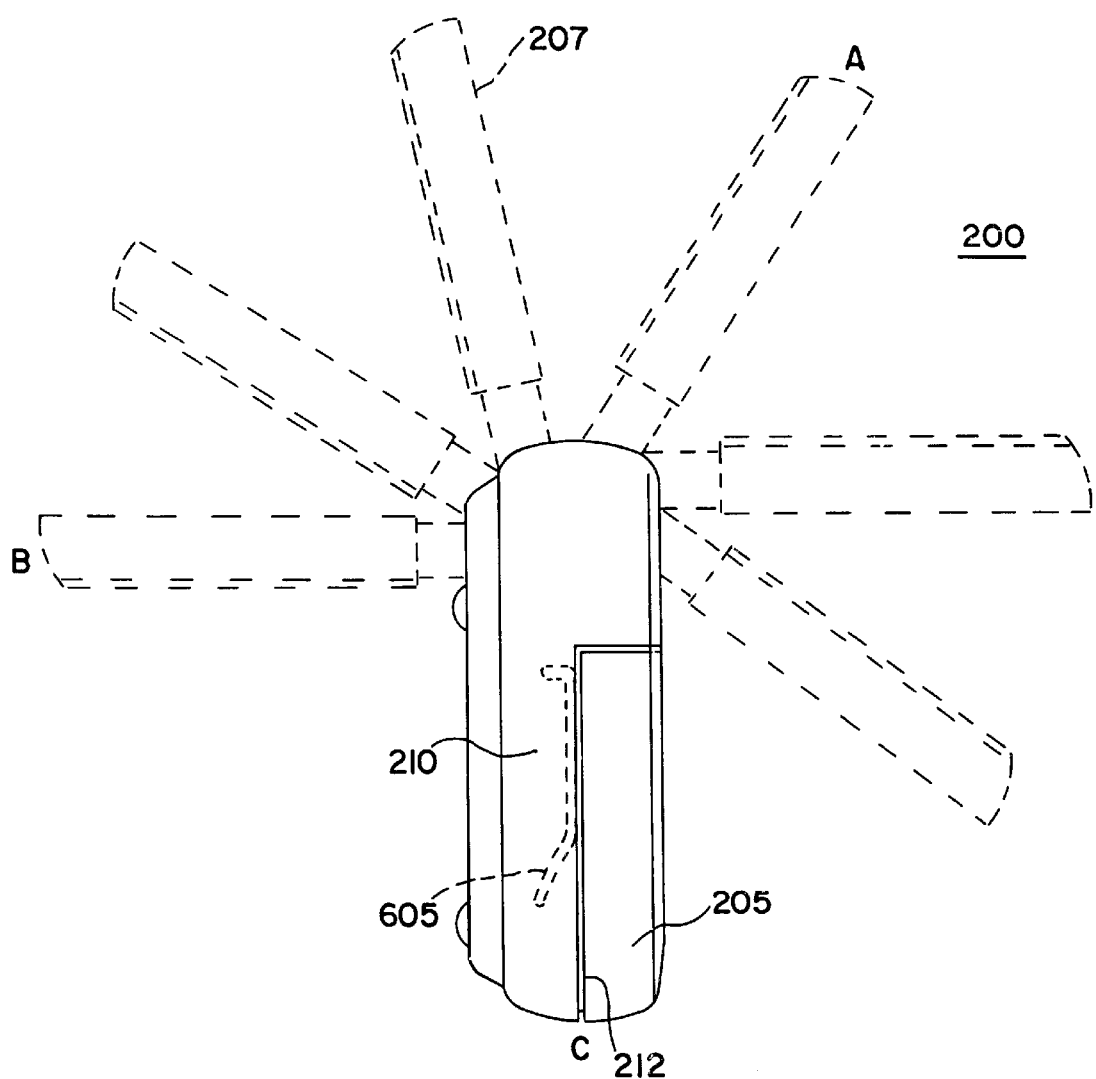
FIG. 7 is a side view of a hinged housing in accordance with an alternative embodiment of the present invention showing in phantom lines the range of motion between body portions of the hinged housing.

Although the first and second body portions 105, 110 are shown only partially rotated toward each other in FIG. 5, in an alternative embodiment shown in FIG. 7, by recessing mounting clip 605 and user-activated controls so that they are not protruding from their respective body portions and by configuring first body portion 205 and second body portion 210 so they mate, control panel 207 can be rotated into a closed position against mounting surface 212 shown as position "C" in FIG. 7. More specifically, in the alternative embodiment shown in FIG. 7, hinged housing 200 includes a first body portion 205 defining a first plane and having a surface with a control panel 207 and a second body portion 210 defining a second plane and having a mounting surface 212. First body portion 205 and second body portion 210 are pivotally hinged to rotate between a first position, in which the first plane and the second plane are parallel (shown in phantom as position "C"), and a second position, in which the first plane and the second plane are oblique, such that in the second position the control panel is rotated at an angle greater than 180 degrees from the mounting surface (shown in phantom as position "B"). By this configuration, hinged housing 200 may be moved between a "desktop" configuration (as shown in phantom position "A" in FIG. 7), a "hip-mounted" configuration (as shown in phantom position "B" in FIG. 7), and a closed configuration (as shown in phantom position "C" in FIG. 7).

Although not intending to be limited to any particular electronic device, hinged housings 100, 200 of the present invention may house a data input/output device having an internal computer device which measures the torques of threaded fasteners via a tensor electronic auditing wrench attached via data input/output port 400.

In summary, the hinged housing according to the present invention utilizes a hinge mechanism which provides for the rotation of one body portion with respect to the other body portion. Furthermore, the design of the hinge mechanism is such that the hinged housing may be rotated and securely held in numerous positions, thereby providing for multiple configurations, such as "desktop" configuration or a stabilized "hip-mounted" configuration. The hinged housing may be conveniently arranged by the user in these different configurations simply by rotating the body portions.

It will be appreciated that there has been provided a hinge mechanism by which two body portions of an electronic device may be rotated into user-selectable positions. Although described above with respect to use with data input/output devices, it is contemplated that the multi-position hinged housing according to the present invention may be incorporated into other electronic devices in which desktop and stabilized hip-mounted usage are desirable.

While embodiments and applications of this invention have been shown and described, it will be apparent to those skilled in the art that many more modifications are possible without departing from the inventive concepts herein described. For example, although described above with respect to use with a preferred embodiment having an internal computer device which measures the torques of threaded fasteners via a tensor electronic auditing wrench attached via data input/output port, it is envisioned that other electronic or computer measuring or controlling devices may be incorporated into the first and second body portions to provide for both desktop and hip-mounted use.

It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A hinged housing for an electronic device comprising:
   a first body portion defining a first plane and having a surface with a control panel comprising a display unit and user-actuated controls for manipulating data on said display unit, and
   a second body portion defining a second plane and having a mounting surface;
   said first and second body portions being pivotally hinged to rotate between
      a first position in which said first plane and said second plane are at an obtuse angle and
      a second position in which said first plane and said second plane are oblique such that in said second position said control panel is rotated at an angle greater than 180 degrees from said mounting surface.

2. The hinged housing according to claim 1, wherein said first and second body portions are pivotally hinged by a hinge mechanism comprising a hinge pin that pivotally rotates within a cylindrical bore.

3. The hinged housing according to claim 2, further comprising a locking mechanism having a ball disposed within a hole intersecting said cylindrical bore, said ball being received by at least one ball slot provided on said hinge pin.

4. The hinged housing according to claim 2, wherein said hinge mechanism further comprises locking shoulders which engage a detent to limit the range of motion of said hinge mechanism between said first and second positions.

5. The hinged housing according to claim 4, wherein said locking shoulders are located on said second body portion and said detent is located on said first body portion.

6. The hinged housing according to claim 1, further comprising a mounting clip mounted on a mounting surface of said second body portion.

7. A hinged housing for an electronic device comprising:
   a first body portion defining a first plane and having a surface with a control panel comprising a display unit and user-actuated controls for manipulating data on said display unit, and
   a second body portion defining a second plane and having a mounting surface;
   said first and second body portions being pivotally hinged to rotate between
      a first position in which said first plane and said second plane are parallel and
      a second position in which said first plane and said second plane are oblique such that in said second position said control panel is rotated at an angle greater than 180 degrees from said mounting surface.

8. The hinged housing according to claim 7, wherein said first and second body portions are pivotally hinged by a hinge mechanism comprising a hinge pin that pivotally rotates within a cylindrical bore.

9. The hinged housing according to claim 8, further comprising a locking mechanism having a ball disposed within a hole intersecting said cylindrical bore, said ball being received by at least one ball slot provided on said hinge pin.

10. The hinged housing according to claim 8, wherein said hinge mechanism further comprises locking shoulders which engage a detent to limit the range of motion of said hinge mechanism between said first and second positions.

11. The hinged housing according to claim 10, wherein said locking shoulders are located on said second body portion and said detent is located on said first body portion.

12. The hinged housing according to claim 7, further comprising a mounting clip mounted on a mounting surface of said second body portion.

* * * * *